United States Patent [19]

Bivens

[11] Patent Number: 5,709,899
[45] Date of Patent: Jan. 20, 1998

[54] CONTINUOUS FILTERING AND TREATING DEVICE AND METHOD

[76] Inventor: Thomas H. Bivens, 6907 FM 1488, Magnolia, Tex. 77355-1250

[21] Appl. No.: 786,090

[22] Filed: Jan. 17, 1997

Related U.S. Application Data

[63] Continuation-in-part of Ser. No. 236,890, May 2, 1994, Pat. No. 5,595,107.

[51] Int. Cl.$^6$ .............................. A47J 37/00; A47J 37/12; C11B 5/00
[52] U.S. Cl. .......................... 426/417; 99/330; 99/403; 99/408; 210/167; 210/DIG. 8; 426/438
[58] Field of Search .................... 99/330, 403, 407, 99/408–410; 210/167, 461, 486, 489, DIG. 8; 126/351, 374, 391; 236/26 A; 134/111, 166 R; 426/417, 438

[56] References Cited

U.S. PATENT DOCUMENTS

| Re. 34,636 | 6/1994 | Bivens. |
|---|---|---|
| 445,223 | 1/1891 | Knight. |
| 2,359,368 | 10/1944 | Klopfenstein. |
| 2,424,211 | 7/1947 | Webb. |
| 2,610,740 | 9/1952 | Hunter. |
| 2,635,527 | 4/1953 | Overbeck et al.. |
| 2,760,641 | 8/1956 | Mies, Jr. et al.. |
| 3,147,220 | 9/1964 | Avery. |
| 3,159,095 | 12/1964 | Wagner. |
| 3,263,818 | 8/1966 | Gedrich. |
| 3,279,605 | 10/1966 | Shepherd. |
| 3,667,374 | 6/1972 | Holmes. |
| 3,735,871 | 5/1973 | Bisko. |

(List continued on next page.)

FOREIGN PATENT DOCUMENTS

| 2146547 | 9/1984 | United Kingdom. |
|---|---|---|
| 91/12304 | 2/1991 | WIPO. |
| 93/17567 | 3/1993 | WIPO. |

OTHER PUBLICATIONS

"New! Permafil Oil Filters"; Filtration International, Inc., Houston, Texas; date unknown.
"Permafil" Brochure; Edible Oil Division, Houston, Texas; date unknown.
Re Nu Brochure, Re Nu Vacuum Filter Manufacturing Company; date unknown.
R.F. Hunter, Co., Inc. Brochure; date unknown.
Robot Coupe USA, Inc. Brochure; date unknown.
Castle Filter Brochure, The Prince Castle Co.; date unknown.
Fastfilter Assembly and Operating Instructions; date unknown.
Custom Built–In Micro–Flo Oil Filtration, Dean/Alco; Nov. 1984.
The Filter Magic System by Frymaster Wellbilt Co. Bulletin No. 818–001 Rev/ Nov. 1986; date unknown.

Primary Examiner—Timothy F. Simone
Attorney, Agent, or Firm—Keeling Law Firm

[57] ABSTRACT

A device and method for continuously and concurrently filtering and treating cooking oil used while frying food in a fryer with cooking oil therein is disclosed, including a filtering mechanism and a treating mechanism. The mechanisms are mechanically interrelated and are both disposed internally of said fryer. The mechanisms include an external wire mesh envelope, including at least one wire mesh filter screen for filtering the cooking oil, and an inner frame disposed within said external wire mesh envelope. The inner frame comprises the outline of a generally rectangular shape with two fingers extending into the rectangular frame from midway along each of two of the frame opposing side walls, said fingers and inner frame supporting the wire mesh envelope. The mechanisms further comprise first and second caps threadedly connected to each other through the wire mesh envelope and the inner frame. The caps provide fluid communication to a suction pump. The inner frame and the interior walls of the wire mesh envelope define compartments to retain treating materials which extend the usable life of the cooking oil. The suction pump draws cooking oil from outside the wire mesh envelope, through the inner frame, through the compartments and treating material, and through the first and second caps.

13 Claims, 3 Drawing Sheets

U.S. PATENT DOCUMENTS

| | | |
|---|---|---|
| 4,113,623 | 9/1978 | Koether et al. . |
| 4,328,097 | 5/1982 | Whaley et al. . |
| 4,591,434 | 5/1986 | Prudhomme . |
| 4,604,203 | 8/1986 | Kyle . |
| 4,623,456 | 11/1986 | Ratner . |
| 4,666,594 | 5/1987 | Schneider . |
| 4,804,466 | 2/1989 | Cooper et al. . |
| 4,805,525 | 2/1989 | Bivens . |
| 4,828,694 | 5/1989 | Leason . |
| 4,945,893 | 8/1990 | Manchester . |
| 4,968,518 | 11/1990 | Lopez . |
| 4,988,440 | 1/1991 | Bernard et al. . |
| 5,049,274 | 9/1991 | Leason et al. . |
| 5,075,000 | 12/1991 | Bernard et al. . |
| 5,143,604 | 9/1992 | Bernard et al. . |
| 5,247,876 | 9/1993 | Wilson et al. . |
| 5,354,455 | 10/1994 | Burklund et al. . |
| 5,404,799 | 4/1995 | Bivens . |
| 5,458,772 | 10/1995 | Eskes et al. . |
| 5,486,370 | 1/1996 | Bivens . |
| 5,595,107 | 1/1997 | Bivens .......................................... 99/408 |

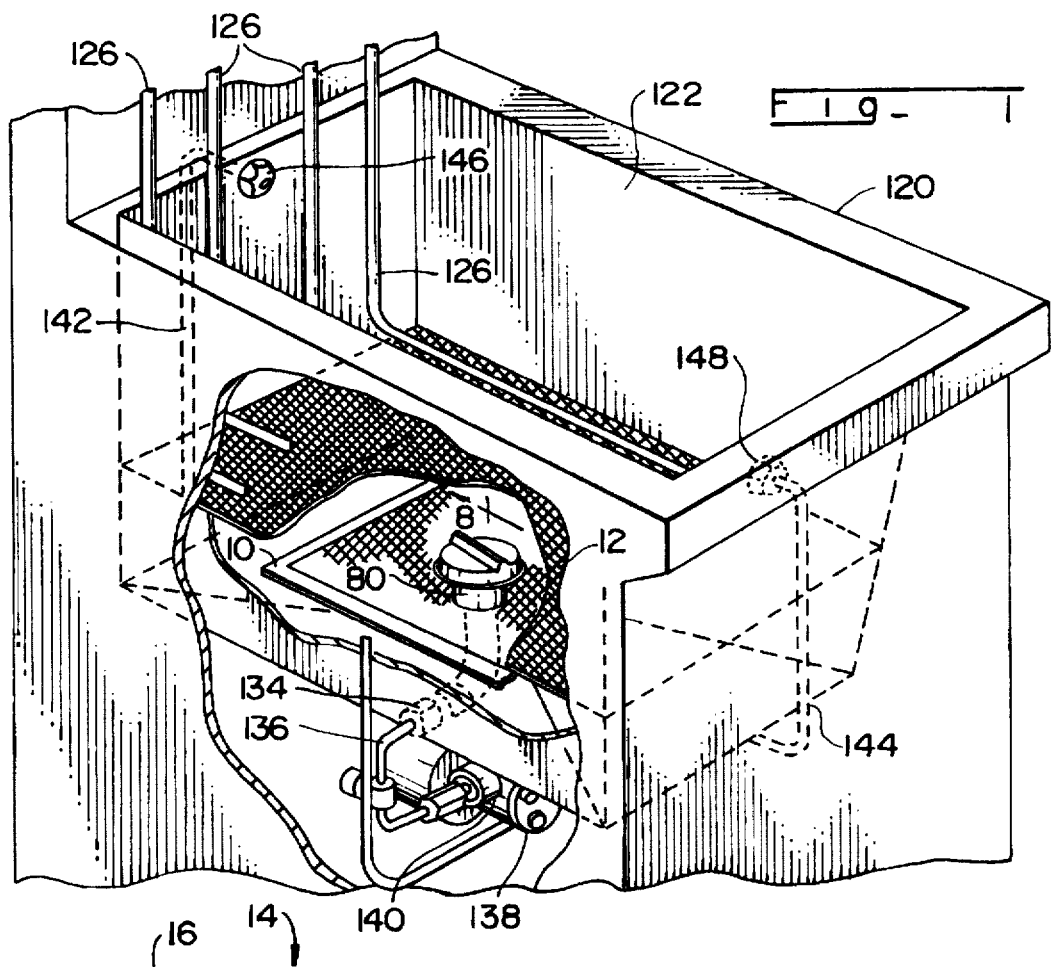
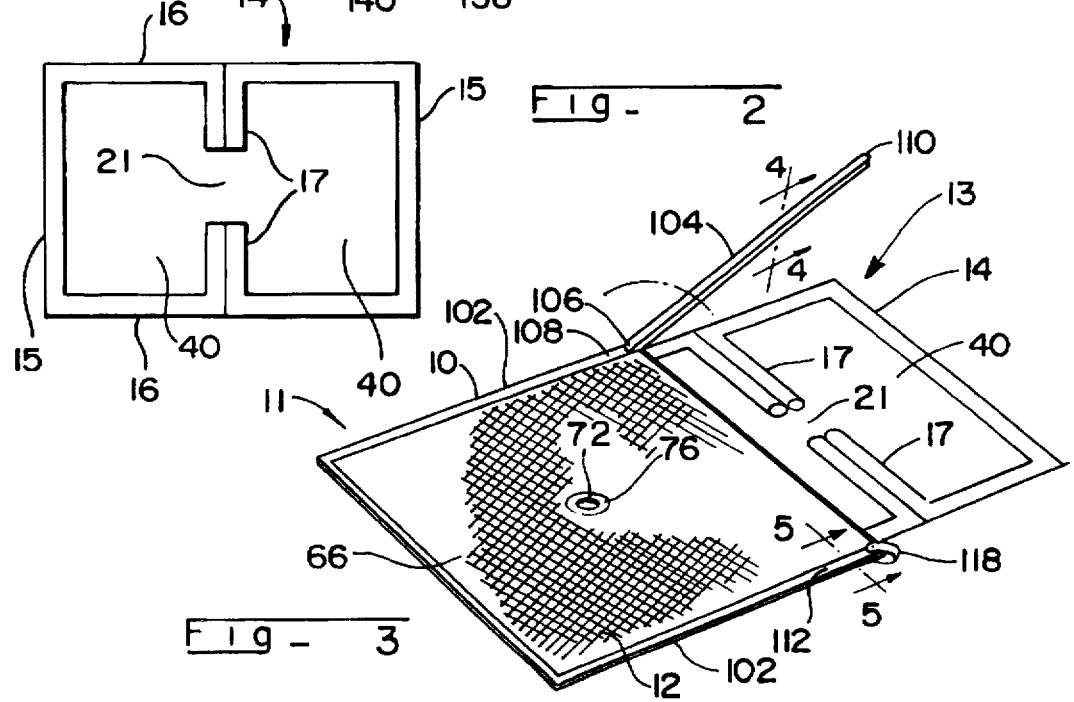

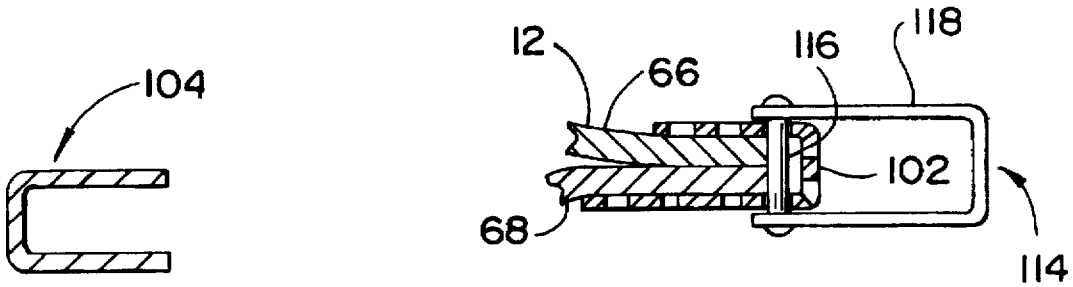
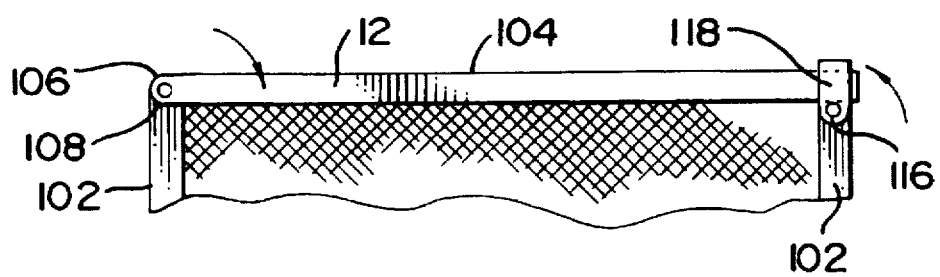
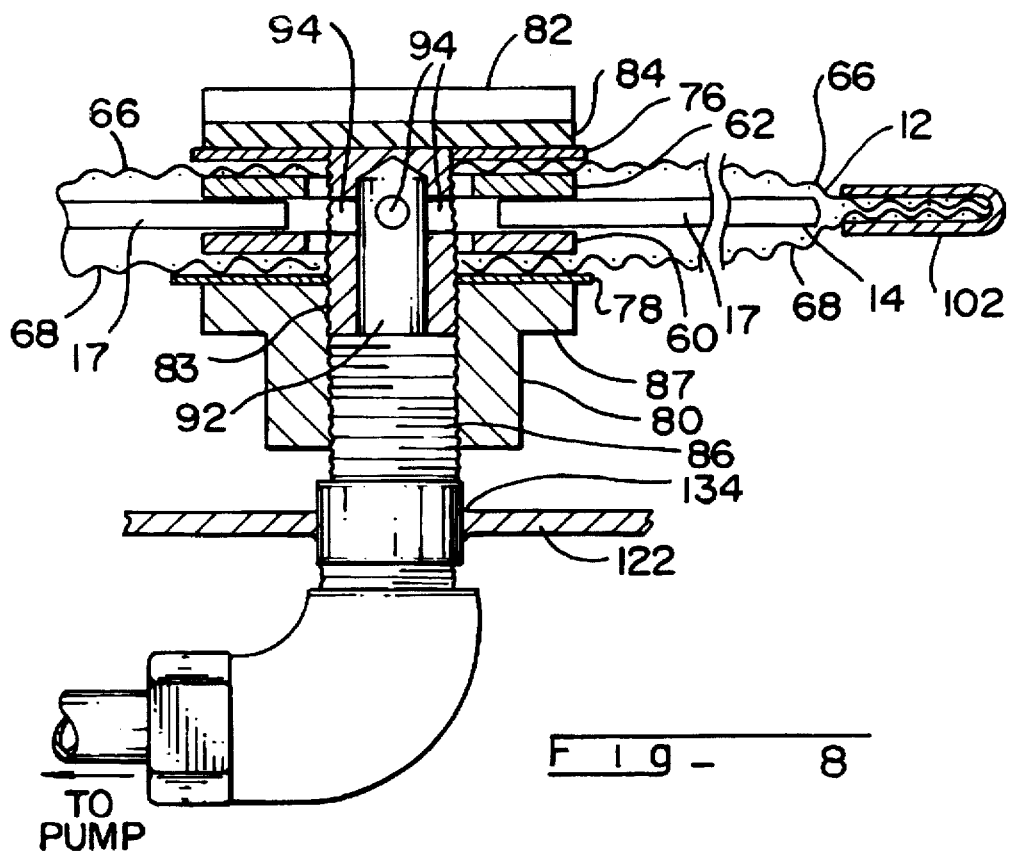

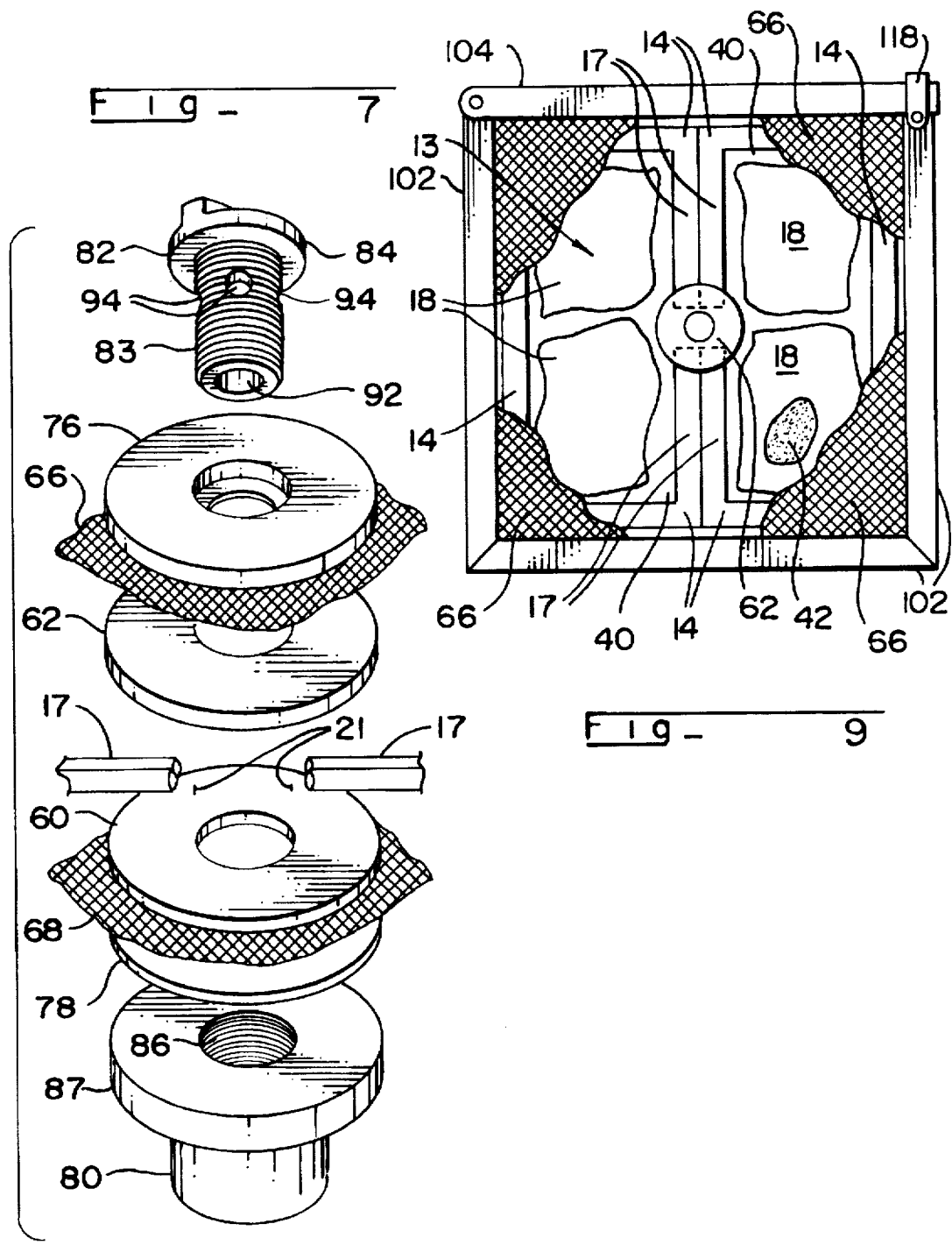

CONTINUOUS FILTERING AND TREATING DEVICE AND METHOD

This application is a continuation in part of Ser. No. 08/236,890, filed by Bivens on May 2, 1994, now U.S. Pat. No. 5,595,107.

BACKGROUND OF THE INVENTION

1. Field of Invention

The present invention relates generally to devices and systems capable of filtering and treating liquids. More specifically, the present invention relates to such devices and systems used to independently, concurrently, and continuously filter and treat cooking oil in fryers.

Fryers are extensively used in the food industry to cook various comestibles. A common type of fryer includes a relatively deep container with the comestible to be cooked immersed in cooking oil in the container. The food industry utilizes substantial quantities of cooking oil in cooking fryers. Extending the usable life of cooking oil would substantially reduce the amount of money spent by the food industry on oil and would thus provide the industry a substantial economic benefit.

However, the cooking and heating processes continually alter and degrade the physical and chemical properties of cooking oil thereby reducing the useful life of the oil. Examples of contributors to the alteration and degradation of the cooking oil are food particles that become dislodged from the food during the cooking process and thereafter remain in the oil, water and fats that are extracted from the food during the cooking process and also remain in the oil thereafter, and free fatty acids that form when heat, water, and oxygen act upon and chemically alter the cooking oil (collectively referred to as "the contributors").

The food particles, if not removed from the cooking oil, will eventually become charred and will impart unwanted tastes, odors, and dark color to the oil. Free fatty acids contribute to the degradation of the cooking oil in that as the percentage of free fatty acids in the cooking oil increases, the smoke, flash, and fire points of the cooking oil are reduced. A large reduction in the smoke, flash, and fire points of the cooking oil may result in a fire hazard and/or may cause excessive smoke emissions. The presence of any of these contributors may, by itself, be cause to replace degraded, used oil with new oil.

In order to prolong the usable life of cooking oil, it is thus productive to neutralize and limit the presence and effects of the contributors by continuously filtering the oil to remove the charred food particles and continuously treating the oil to neutralize some of the chemical alterations generated by the contributors.

In addition, the continuous filtration of cooking oil during the cooking process provides the benefit of reducing the cooking oil temperature and/or cooking time required as compared to operations which do not employ continuous filtration. Continuous filtration, in general, involves the continuous recirculation of oil in a system, pumping the oil out of the fryer and back into the fryer. This recirculation process which involves the turnover of the entire cooking oil in the fryer within a given time period imparts consistent cooking oil temperatures throughout the fryer. Uniform cooking oil temperatures throughout the fryer provides for the most efficient use of the energy required to maintain the necessary cooking oil temperature in the fryer zone where the oil and the food come into contact. Energy consumption in the fryer and its cooking oil is thus significantly reduced.

2. Related Art

In prior art systems, cooking oil is cleaned by pumping it through a filter assembly often containing filter paper or other disposable filter media. A filter powder is normally applied to the filter media by dispersal in the cooking oil. Filter powders commonly consist of diatomaceous earth, perlite or magnesium silicate. In the filtration process, filter powders form a coating on the surface of filter media and thereby mechanically strain suspended solids from liquids.

In such prior art systems, filtration with the aid of filter powder takes place only after the cooking process is interrupted and the cooking oil is allowed to cool. This type of "intermittent" or "batch" filtration can necessarily only filter the oil after the contributors have been created and have already adversely affected the cooking oil and the food. Thus, the benefits of "intermittent" or "batch" filtration are limited.

U.S. Re-Issue Pat. No. 34,636 to the present inventor discloses a cooking oil filtering apparatus for removal of particulates from cooking oil. Cooking oil is drawn through wire mesh screens supported outside a filter insert by applying a suction interior of the wire mesh screens. The subject apparatus eliminates the need for filter paper. The subject apparatus, like the previously-described prior art, contemplates only "intermittent" or "batch" filtration.

This applicant's U.S. Pat. No. 5,404,799 discloses a continuous filtering fryer, the continuous filtering fryer comprising a filtering element including wire mesh screens disposed adjacent the bottom of the fryer supported outside a filter insert, an outlet line from the filter insert to a suction pump, the pump drawing cooking oil through the wire mesh screens and returning the cooking oil to the container. Such apparatus allows continuous filtering during the cooking operation.

The prior art does not disclose a device having the characteristics of providing filtering of cooking oil and concurrently treating the cooking oil by exposing it to materials which extend the usable life of the cooking oil.

This applicant's copending U.S. application Ser. No. 08/236,890 provides such a device and discloses a filtering and treating device including an external wire mesh filter screen, an inner, rigid, perforated support shell, and a centrally-disposed spool, the spool including fluid channels connectable to a suction pump. The shell and the interior walls of the wire mesh filter screen define compartments to retain treating materials, such as activated carbon, which extend the usable life of the cooking oil. The suction pump draws liquid from outside the wire mesh envelope through the support shell, through the support shell compartments and treating material and through the central spool. Thus, the claimed device is capable of continuously and concurrently filtering and treating cooking oil during the cooking operation.

SUMMARY OF THE INVENTION

It is an object of the present invention to provide a continuous and concurrent filtering and treating device and system with an alternative embodiment to that device disclosed in this applicant's copending U.S. application Ser. No. 08/236,890.

These and other objects of the present invention will become apparent from a reading of the attached specification and appended claims.

My invention is a continuous and concurrent filtering and treating device, comprising a filtering mechanism and a treating mechanism. The mechanisms are mechanically interrelated and are both disposed internally of a fryer. The mechanisms include an external wire mesh envelope, an inner frame, and first and second caps threadedly connected to each other and providing fluid communication to a suction pump. The inner frame and the interior walls of the wire mesh envelope define compartments to retain treating materials, such as activated carbon, which extend the usable life of the cooking oil. The suction pump draws liquid from outside the wire mesh envelope through the inner frame, through the inner frame compartments and treating material and through the first and second caps. Thus, the claimed device is capable of continuously and concurrently filtering and treating cooking oil during the cooking operation.

The inner frame comprises the outline of a generally rectangular shape with two fingers extending into the rectangular frame from midway along each of two of the frame's opposing side walls. The fingers serve to support the wire mesh filter screen, together with the device's abutting parts, once the first cap is fastened to the second cap.

BRIEF DESCRIPTION OF THE DRAWINGS

FIG. 1 is an isometric view of the filtering and treating device of the present invention immersed in a tank.

FIG. 2 is a top view of the inner frame.

FIG. 3 is an isometric, partial cutaway view of the filtering mechanism of the present invention with the inner frame of FIG. 2 partially inserted in a wire mesh envelope.

FIG. 4 is a cross-sectional view at line 4—4 of FIG. 3.

FIG. 5 is a cross-sectional view at line 5—5 of FIG. 3.

FIG. 6 is a view of an end of the wire mesh envelope.

FIG. 7 is an exploded view of the center of the wire mesh screen, the center of the inner frame, washers, and upper and lower caps.

FIG. 8 is a cross-sectional view along line 8—8 of FIG. 1.

FIG. 9 is a partial cut-away view of the inner frame and the pouches fully inserted in the wire mesh screen.

DETAILED DESCRIPTION OF THE INVENTION

Referring first to FIG. 1, there is shown at 10 the filtering and treating device of the present invention in one embodiment. The principal components of the filtering and treating device 10 comprise a filtering mechanism 11 and a treating mechanism 13. In the present embodiment, the filtering mechanism 13 and the treating mechanism 11 are mechanically interrelated and are both located within tank 122 and generally comprise a wire mesh envelope 12, an inner frame 14, a first cap 82, a second cap 80, and pouches 18 of treating material 42. Referring to FIG. 9, the frame 14 is shown in partial cutaway view to illustrate pouches 18 contained therein. Also referring to FIG. 9, one pouch 18 is shown in partial cutaway view to illustrate treating material 42 contained therein.

Details of the frame 14 are depicted in FIG. 2. Frame 14 comprises the outline of a generally rectangular shape with opposing first side walls 15, opposing second side walls 16, and two fingers 17. Each of the two fingers 17 extends into the rectangular frame 14 from midway along each of the two opposing second side walls 16. A central space 21 is defined between fingers 17. Frame 14 may consist of one integral part or it may consist of its different parts attached to each other as shown in FIG. 2. Such attachment may be accomplished by welding or by other permanent attachment means.

The dimensions of frame 14 are sized and manufactured to allow frame 14 to be inserted into wire mesh envelope 12. Frame 14 is constructed of a rigid material, such as stainless steel. Although the frame 14 may have any cross-sectional area, the preferred embodiment of frame 14 has a uniform cross-sectional area.

Referring to FIG. 3, the frame 14 is depicted partially inserted in wire mesh envelope 12. Wire mesh envelope 12 includes a first rectangular wire mesh filter screen 66 and a second rectangular wire mesh filter screen 68 (not shown in FIG. 3). The first filter screen 66 and the second filter screen 68 are substantially the same length and width. A channel 102 extends around three peripheral edges of filter screens 66 and 68, the peripheral edges of filter screens 66 and 68 extending into the channel 102. In the preferred embodiment the peripheral edges of filter screens 66 and 68 are fixedly retained in channel 102 by welding. Frame 14 and pouches 18, in cooperation, support wire mesh screens 66 and 68.

A channel 104 is rotatably attached at a channel first end 106 to an end 108 of channel 102. A second, distal end 110 of channel 104 is releasably connectable to a second end 112 of channel 102. Upon complete insertion of the frame 14 within wire mesh envelope 12, channel 104 is rotatable to a closed position with end 110 adjacent end 112.

Referring to FIG. 4, a cross-sectional view of channel 104 is depicted, the channel 104 comprising a generally u-shaped member. The cross-sectional view of channel 104 is typical of channel 102.

Referring to FIG. 5, a connector 114 is depicted at line 5—5 of FIG. 3, connector 114 comprising a generally u-shaped band 118 rotatably connected by rod 116 to channel 102. Rod 116 extends through end 112 of channel 102. Upon rotation of channel 104 to the closed position with end 110 adjacent end 112, band 118 may be rotated about rod 116 to a position exterior of end 110 of channel 104, thereby retaining channel 104 in the closed position.

Referring to FIG. 6, a section of the wire mesh envelope 12 is depicted with channel 104 in the closed position and with the band 118 rotated exterior of end 110 of channel 104 thereby retaining the wire mesh envelope 12 in a closed condition.

Referring to FIG. 3, an aperture 72 is located centrally of filter screen 66. A like aperture 74 (not shown in FIG. 3) is located centrally of filter screen 68. Upon installation of the inner frame 14 into wire mesh envelope 12, the central space 21 in between fingers 17 of inner frame 14 is aligned with the apertures 72 and 74.

A washer 76 is juxtaposed against the exterior of filter screen 66. A like washer 78 (not shown in FIG. 3) is juxtaposed against the exterior of filter screen 68. Upon installation of the inner frame 14 into wire mesh envelope 12, the annular openings of washers 76 and 78 are located centrally of filter screens 66 and 68 respectively, and are aligned with apertures 72 and 74 respectively.

Details of the assembly of the central portion of the envelope 12 with inner frame 14 inserted therein are depicted in an exploded isometric view, FIG. 7, including a first cap 82, a second cap 80, washers 76 and 78, wire mesh screens 66 and 68, washer members 60 and 62, and fingers 17 of inner frame 14.

Second cap 80 includes a generally flat lip 87 at one end. Second cap 80 also includes an internally-threaded axial passageway 86 therethrough.

First cap 82 includes a head portion 84 and a threaded body portion 83. The threaded body portion 83 has an interior passageway 92 drilled therein which is in fluid communication with the interior passageway of an outlet port 134. The interior threads of second cap 80 engage the male external threads on the body portion 83 of first cap 82. A plurality of ports 94 extend radially through the body portion 83. The ports 94 are in fluid communication with the interior passageway 92. And, in the assembled configuration, the ports 94 are in fluid communication with the compartments 40 defined by inner frame 14 such that any suction applied to the interior passageway 92 will cause cooking oil to pass from the compartments 40 through the radial ports 94, through the interior passageway 92, and through the outlet port 134.

In its assembled configuration, washer 78 is juxtaposed between lip 87 of second cap 80 and second mesh screen 68. In its assembled configuration, washer 76 is juxtaposed between first mesh screen 66 and the head portion 84 of first cap 82.

Washer 62 is interposed between the fingers 17 of the inner frame 14 and first mesh screen 66. Similarly, washer 60 is interposed between the fingers 17 of the inner frame 14 and second mesh screen 68. Washers 60 and 62 provide suitable separation between the inner frame 14 and the mesh screens 66 and 68. The central space 21 between the fingers 17 of inner frame 14 and the annular openings of the washers 60 and 62 accommodate the body portion 83 of the first cap 82. As shown in FIG. 8, as the first cap 82 is tightened within the threads of the second cap 80, the elements of the device 10 are drawn together in a sandwiched configuration. Those elements, as embodied in FIG. 8, include first cap 82, washer 76, wire mesh screen 66, washer 62, fingers 17 of inner frame 14, washer 60, wire mesh screen 68, washer 78, and second cap 80.

Referring to FIG. 9, a partial cut-away view, frame 14 is depicted as being fully inserted in wire mesh envelope 12. Washer 60 is shown disposed on the fingers 17 of inner frame 14. Washer 62 (not shown) is similarly disposed on the other side of the fingers 17 of inner frame 14. Several pouches 18 are disposed in the two compartments 40 defined by the opposing first side walls 15, opposing second side walls 16, two fingers 17, and mesh filter screens 66 and 68. The preferred embodiment of the inner frame 14 allows for the optimum space within wire mesh envelope 12 and thus also allows for optimum accumulation of pouches 18 and treating material 42 within the wire mesh envelope 12.

In the preferred embodiment, pouch 18 is constructed of a woven material permeable to liquids. The pouch 18 is closed around its perimeter containing therein treating material 42 for treatment of liquids flowing through the pouch 18.

Referring now to FIG. 1, the filtering and treating device 10 of the present invention is depicted disposed in a fryer 120. The fryer 120 includes a tank 122 and heating elements 126. The device 10 is disposed in tank 122.

The second cap 80 is connected to the outlet port 134 extending exterior of tank 122. Such connection may be a permanent connection such as by welding or a releasable connection such as by threading to allow removal of second cap 80 as desired. Outlet port 134 is connected by pipe 136 to pump 138. Outlet port 134 and pipe 136 provide fluid communication between second cap interior passageway 86 and the inlet 140 of pump 138. The outlet (not shown) of pump 138 is connected through a header (not shown) to two inlet flow lines 142 and 144, such inlet flow lines connected to inlet ports 146 and 148 respectively.

In use, filtering mechanism 11 is disposed in tank 122 and the tank 122 is filled to a predetermined level with cooking oil (not shown). Upon activation of pump 138 a suction is created in interior passageway 86 drawing cooking oil from within the interior of tank 122 through the wire mesh envelope 12, through the frame 14, through the compartments 40 and pouches 18 therein, through the ports 94, through the first cap interior passageway 92 and into second cap interior passageway 86. The pump 138 circulates the cooking oil from interior passageway 86 through outlet port 134 and back into the tank 122 through inlet ports 146 and 148. Frame 14, in cooperation with pouches 18, maintains separation of wire mesh screens 66 and 68.

Upon such circulation, the particulate matter within the cooking oil contained within the tank 122 will accumulate on the upper filter screen 66 and lower filter screen 68. The filtered cooking oil concurrently flows into the compartments 40 thereby engaging pouches 18 containing materials 42 for treating the cooking oil. At contact with the cooking oil, the treating material imparts to the cooking oil desired characteristics or provides further filtering to the cooking oil of undesirable matter.

Cooking oil may be pumped from the interior of tank 122 and returned into the interior of the tank 122 in a continual manner while the fryer is in use. Suitable pump control means and pressure measurement means are provided to control the flow of cooking oil. Such control means and pressure measurement means are not depicted as they comprise conventional electrical controllers and pressure and/or vacuum gauges.

In use, particles and fat globules contained in the cooking oil will accumulate on the outer surfaces of the mesh screens 66 and 68. It has been found that, over time, the accumulation of particles forms a filter cake (not shown) which serves to filter the cooking oil. Very small flow paths will form through the filter cake as it accumulates on the exterior surfaces of the screens 66 and 68. The upper screen 66 and lower screen 68 effectively filter the cooking oil.

A filter powder may be added to the cooking oil. The filter powder may be comprised of a diatomaceous earth, perlite, a chemical mixture or a combination of these. As the filter powder is added to the cooking oil, the filtering and treating device 10 draws the filter powder such that it rests in surface-to-surface contact with the outer screens 66 and 68. The flow path of the cooking oil and the composition of the filter powder causes the filter powder to aggregate at the outer surfaces of the screens 66 and 68, forming filter cake. The filter cake may be comprised of a combination of filter powder and comestible particulate matter or alternatively, simply comestible particulate matter. The suction applied by the pump 138 to the filtering and treating device 10 maintains fluidic channels within said filter cake allowing for the continued filtering of the cooking oil.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A filtering and treating device for continuous filtering and treating of cooking oil disposed in a fryer comprising:
   a frame constructed of rigid material;
   at least one wire mesh envelope exterior of said frame;
   said at least one wire mesh envelope comprising at least one wire mesh filter screen surrounding said frame;
   at least one pouch having a treating material therein;

said at least one pouch constructed to allow fluid flow therethrough;

at least one interior compartment of said frame for receiving said at least one pouch;

said at least one pouch removably positioned in said interior compartment;

suction means in fluid communication with said interior compartment;

so that upon engagement of said suction means, liquid is drawn through said at least one wire mesh screen, said interior compartment, and said at least one pouch; and thereby the liquid is both filtered and treated by the device.

2. A device as in claim 1 wherein said at least one wire mesh screen at least partially supported by said frame and said at least one pouch.

3. A device as in claim 1 wherein said frame including:

opposing side walls;

at least two fingers extending into said at least one compartment from said side walls;

said at least two fingers defining a central space therebetween; and said at least two fingers at least partially supporting said at least one wire mesh screen.

4. A device as in claim 3 further comprising:

at least one washer juxtaposed between said at least two fingers and said at least one wire mesh screen; and said at least one washer at least partially supporting said at least one wire mesh screen.

5. A device as in claim 4 wherein said suction means including:

a first cap cooperatively engaged with a second cap;

said second cap including an interior channel; and said interior channel in fluid communication with said at least one interior compartment and said suction means.

6. A device as in claim 5 wherein:

said first cap having a body portion with external threads;

said second cap having cooperatively engaging internal threads;

said at least one wire mesh screen having a hole sized to receive said body portion;

said head portion inserted through said hole, through said at least one washer, through said central space of said frame, and in said second cap;

thereby threadably fastening said first cap to said second cap; and thereby securing said at least one wire mesh screen, said washer member, and said frame therebetween.

7. A method of continuously filtering and treating cooking oil wherein the cooking oil is contained within a tank comprising the steps of:

positioning a filtering mechanism within said tank;

positioning a treating mechanism within said tank;

positioning piping means in fluid communication with said filtering mechanism and said treating mechanism; and pumping said cooking oil through said filtering mechanism thereby filtering said cooking oil, through said treating mechanism thereby treating said cooking oil, through said piping means, and returning said cooking oil into said tank at a level below the surface of said cooking oil.

8. The method of claim 7 further comprising the step of:

heating said cooking oil to a desired temperature; and said pumping step continually performed during a first period to circulate said cooking oil until an aggregation of particulate matter accumulates on an outer surface of said filtering mechanism, and continually pumping said cooking oil thereafter during a second period while frying the food product.

9. The method of claim 7 further comprising:

positioning said treating mechanism within said filtering mechanism.

10. The method of claim 7 wherein:

said treating mechanism positioning step including placing an inner frame within said tank, said inner frame defining at least one compartment;

said filtering mechanism positioning step including placing at least one wire mesh screen exterior of said inner frame, said inner frame supporting said at least one wire mesh screen;

said treating mechanism positioning step further including removably placing at least one pouch filled with treating material within said at least one compartment, said at least one pouch supporting said at least one wire mesh screen;

said pumping step including pumping said cooking oil through said at least one wire mesh screen thereby filtering said cooking oil, through said inner frame, through said compartments, through said at least one pouch, through said treating material thereby treating said cooking oil, through said piping means, and returning said cooking oil into said tank at a level below the surface of said cooking oil; and further comprising the step of securing said at least one wire mesh screen to said inner frame.

11. The method of claim 10 wherein:

said inner frame placing step including providing a frame having the outline of a generally rectangular shape with two sets of opposing side walls and having at least two fingers extending into said frame from midway along each of two of said frame's opposing side walls, said two fingers defining a central space therebetween.

12. The method of claim 11 further comprising the step of:

providing at least one washer juxtaposed between said at least two fingers and said at least one wire mesh screen, said washer supporting said at least one wire mesh screen; and said securing step including securing together said at least one wire mesh screen, said at least one washer, and said frame.

13. The method of claim 12 wherein said securing step including:

providing a first cap having a body portion with external threads;

providing a second cap having cooperatively engaging internal threads;

inserting said body portion through at least one wire mesh screen, said at least one wire mesh screen having a hole for insertion therein, through said at least one washer, through said central space of said frame, and in said second cap; and threadably fastening said first cap to said second cap thereby securing together said at least one wire mesh screen, said washer member, and said frame therebetween.

\* \* \* \* \*